(12) United States Patent
Tseng et al.

(10) Patent No.: US 7,165,856 B2
(45) Date of Patent: Jan. 23, 2007

(54) LIGHT-DUIDE PLATE AND BACKLIGHT MODULE

(75) Inventors: Wei-Yang Tseng, Hsinchu (TW);
Chu-Chi Ting, Hualien County (TW);
Tien-Lung Chiu, Kaohsiung (TW);
Wei-Yu Lo, Taichung County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 75 days.

(21) Appl. No.: 10/906,462

(22) Filed: Feb. 22, 2005

(65) Prior Publication Data
US 2006/0187675 A1    Aug. 24, 2006

(51) Int. Cl.
*F21V 8/00* (2006.01)

(52) U.S. Cl. .................. 362/26; 362/555; 362/610; 362/616; 362/615

(58) Field of Classification Search ........ 362/606–607, 362/615–616, 612–613, 628–629, 26–27, 362/561, 31; 349/612–613, 62, 65
See application file for complete search history.

(56) References Cited

U.S. PATENT DOCUMENTS

| | | | | |
|---|---|---|---|---|
| 5,913,594 A | * | 6/1999 | Iimura | 362/607 |
| 6,036,329 A | * | 3/2000 | Iimura | 362/607 |
| 6,873,387 B1 | * | 3/2005 | Hokazono et al. | 349/137 |
| 2003/0043567 A1 | * | 3/2003 | Hoelen et al. | 362/31 |
| 2006/0044830 A1 | * | 3/2006 | Inoue et al. | 362/614 |

* cited by examiner

*Primary Examiner*—Renee Luebke
*Assistant Examiner*—Robert May
(74) *Attorney, Agent, or Firm*—Jianq Chyun IP Office

(57) ABSTRACT

A light-guide plate comprising a light-guide board having a first refractive index and at least one light-guide part buried inside the light-guide board is provided. The light-guide part has a second refractive index larger than the first refractive index. The light-guide board and the light-guide part buried therein have different refractive indices so that the total reflection may occur for improving the light transmission efficiency in the light-guide plate.

16 Claims, 4 Drawing Sheets

LIGHT-DUIDE PLATE AND BACKLIGHT MODULE

BACKGROUND OF THE INVENTION

1. Field of the Invention

The present invention generally relates to a light-guide plate and a backlight module. More particularly, the present invention relates to a light-guide plate and a backlight module capable of improving the light transmission efficiency.

2. Description of Related Art

With recent advancement in opto-electronic fabricating techniques, the development of flat panel display devices such as liquid crystal display (LCD), organic light emitting diode (OLED) and plasma display panel (PDP) have proceeded quite rapidly. Especially, the liquid crystal display has been widely applied to cell phones, notebooks, personal computers, personal digital assistant (PDA) and the like.

For a liquid crystal display device, a backlight module is needed to provide the surface light source for the liquid crystal panel. Generally, the backlight module may be a direct type backlight module or an edge type backlight module. For the direct type backlight module, several parallel lamps are disposed inside a frame to form a surface light source. However, the direct type backlight module has a higher thickness, which is disadvantageous for application in thin display devices. For the edge type backlight module, a light source is arranged on the side surface of a light-guide plate so that a surface light source is produced through the light-guide plate.

In the edge type backlight module, the light transmission efficiency of the light-guide plate is important. If the light transmitted in the light-guide plate has higher energy loss or does not transmit out from the light-guide plate, it may deteriorate the light transmission efficiency. With advancement in the large size display device, a light-guide plate having high light transmission efficiency and a backlight module capable of providing a high bright surface light source is highly desirable.

SUMMARY OF THE INVENTION

Accordingly, the present invention is directed to a light-guide plate for improving light transmission efficiency.

The present invention is directed to a backlight module capable of providing a high bright surface light source.

According to an embodiment of the present invention, a light-guide plate is provided. The light-guide plate comprises a light-guide board having a first refractive index and at least one light-guide part buried inside the light-guide board, wherein the light-guide part has a second refractive index larger than the first refractive index.

The light-guide board and the light-guide part buried inside the light-guide board have different refractive index so that the total reflection may occur for improving the light transmission efficiency in the light-guide plate.

According to an embodiment of the present invention, backlight module is provided. The backlight module comprises a light-guide plate and a light source. The light-guide plate comprises a light-guide board and at least one light-guide part buried inside the light-guide board, wherein the light-guide board has a first refractive index while the light-guide part has a second refractive index larger than the first refractive index. The light source is arranged on a light-incident surface of the light-guide plate, and the light source is aligned to the light-guide part of the light-guide plate.

The backlight module of the present invention has the light-guide plate having high light transmission efficiency so that the backlight module can be applied to large size LCD devices.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
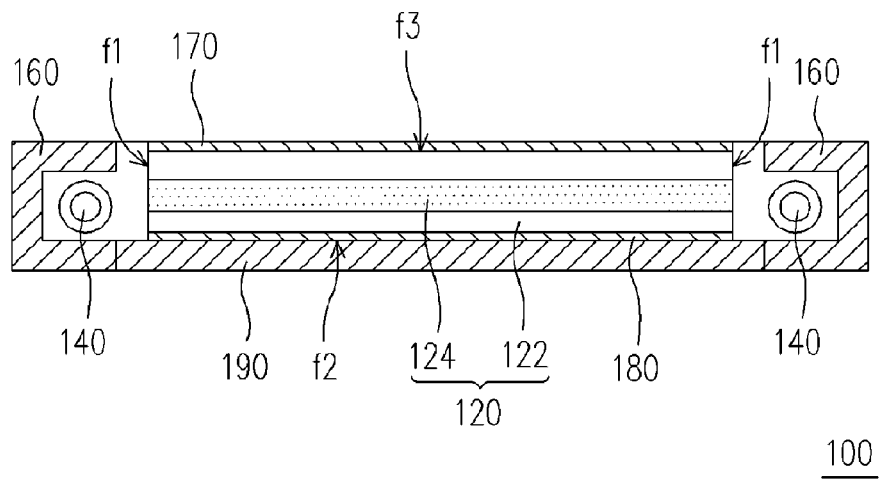
FIG. 1 is a schematic cross-sectional view showing an edge type backlight module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic cross-sectional view showing an edge type backlight module according to an embodiment of the invention. The edge type backlight module 100 comprises at least a light-guide plate 120 and a light source 140. In an embodiment, the backlight module 100 further comprises a reflective cover 160, at least one optical film 170, a reflective film 180 and a frame 190.

As shown in FIG. 1, the light-guide plate 120 further comprises a light-guide board 122 and at least one light-guide part 124 buried inside the light-guide board 122. Preferably, the light-guide part 124 is uniformly buried inside the light-guide board 122. The light-guide board 122 has a first reflective index $n_1$ while the light-guide part 124 has a second reflective index $n_2$ different from the first reflective index $n_1$. In a preferred embodiment, the second reflective index $n_2$ is higher than the first reflective index $n_1$. For example, the first reflective index $n_1$ is in a range of 1.4~1.5 while the second reflective index $n_2$ is in a range of 1.5~1.6. The light-guide board 122 is selected from the group consisting of epoxy, polymethylmethacrylate (PMMA) and a combination thereof, for example. The light-guide part 124 is selected from the group consisting of Zeonor, Arton, polycarbonate(PC), epoxy and a combination thereof, for example. Zeonor and Arton are an amorphous polyolefne and are respectively manufactured by Zeon Ltd. (Japan) and JSR Ltd. (Japan). In the present embodiment, the second reflective index $n_2$ of the light-guide part 124 is higher than the first reflective index $n_1$ of the light-guide board 122 so that the total reflection may easily occur when the light is incident on the light-guide board 122 from light-guide part 124, and thus the light transmission efficiency in the light-guide plate 120 can be improved.

Figure 2:
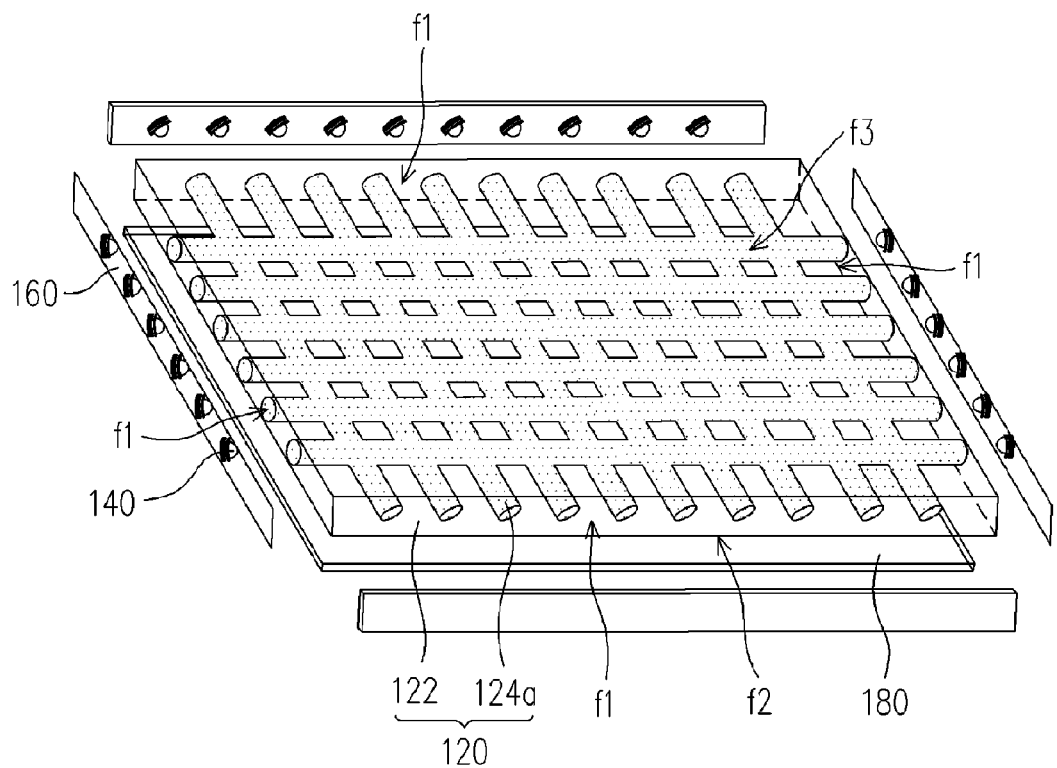
FIG. 2 is a schematic drawing showing a backlight module having a network light-guide part according to an embodiment of the invention.

In an embodiment of the present invention, the light-guide part buried inside the light-guide board may be a network structure. As shown in FIG. 2, the light-guide board 122 and the light-guide part 124a are integrated together to form the light-guide plate 120. This network light-guide part 124a provides more light transmission paths so as to contribute to uniform light transmission in the light-guide plate 120. In addition, several scattering points may further be formed on the network light-guide part 124a for light scattering to produce a more uniform surface light source.

Figure 3:
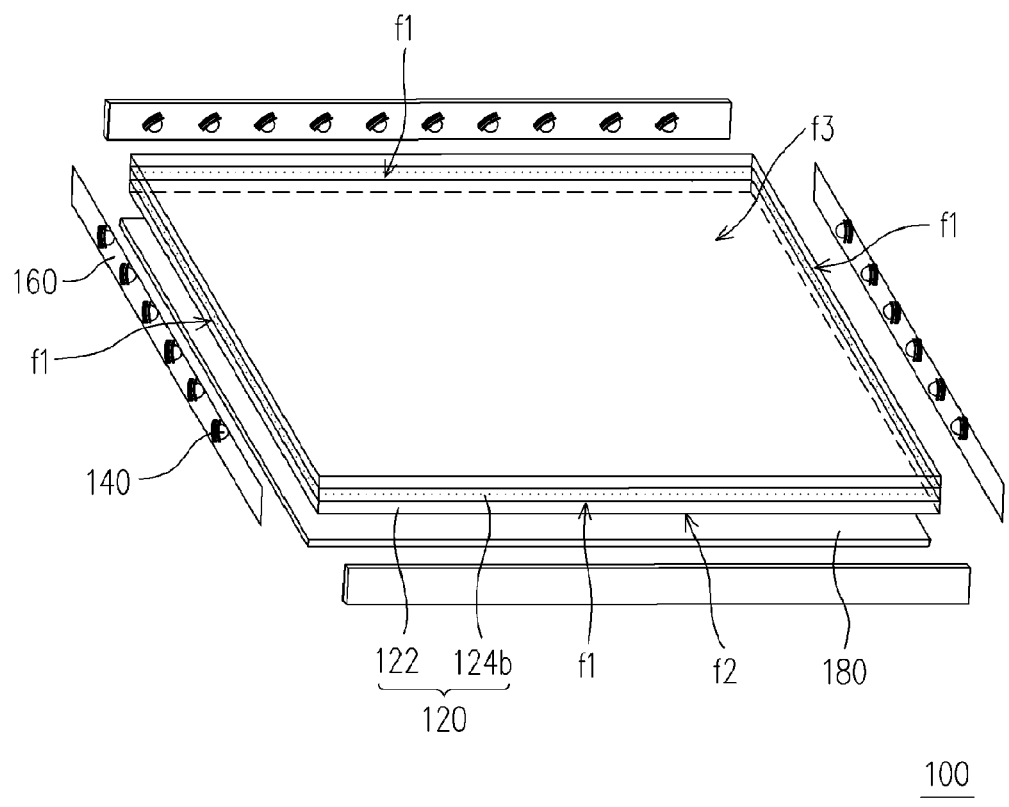
FIG. 3 is a schematic drawing showing a backlight module having a sheet light-guide part according to an embodiment of the invention.

In another embodiment of the present invention, the light-guide part buried inside the light-guide board may be a sheet structure. As shown in FIG. 3, the light-guide board 122 and the sheet light-guide part 124b sandwiched therein are integrated together to form the light-guide plate 120.

In the backlight module 100 as shown in FIG. 1, the light-guide plate 120 has six surfaces including a light-transmission surface f3, a reflective surface f2 opposite to the light-transmission surface f3 and four light-incident surfaces (side surfaces) f1. The light source 140 is arranged on the four light-incident surfaces f1 of the light-guide plate 120, and the light source 140 is aligned to the light-guide part 124 of the light-guide plate 120. In an embodiment, the light source 140 is constituted of several light emitting diodes or other point light sources, for example.

In addition, the reflective cover 160 is disposed outside the side surfaces f1 of the light-guide plate 120 so that the light of the light source 140 can be fully incident on the light-guide plate 120. The optical film 170 is disposed above the light-guide plate 120. The optical film 170 comprises, for example, a diffusion film, a light-collecting film or other optical film. The reflective film 180 is disposed underneath the light-guide plate 120 for reflecting light. The frame 190 is disposed outside the light-guide plate 120 and the light source 140 to assemble the light-guide plate 120, the light source 140, the reflective film 180 and the optical film 170 together.

The utilization rate of the light source 140 is relative to the relationship between the light source 140 and the light-guide plate 120. Thus, in an embodiment of the present invention, as shown in FIG. 2 and FIG. 3, the light source 140 arranged on the surfaces f1 is aligned to the network light-guide part 120a or the sheet light-guide part 120b of the light-guide plate 120 so that the light can be directly incident on the light-guide part 120 (the network light-guide part 120a or the sheet light-guide part 120b) for improving utilization rate of the light source 140.

Figure 4:
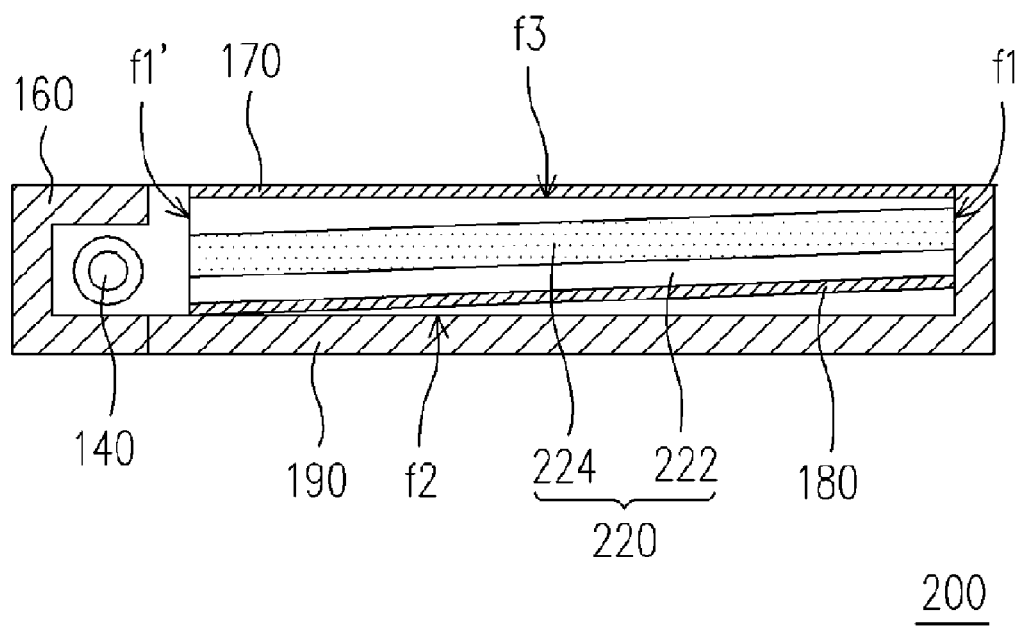
FIG. 4 is a schematic cross-sectional view showing an edge type backlight module according to another embodiment of the invention.

The light-guide plate composed of two components having different refractive index may also be applied to a backlight module having a wedge light-guide plate therein. As shown in FIG. 4, the backlight module 200 comprises at least a light-guide plate 220 and a light source 140. In a preferred embodiment, the backlight module 200 further comprises a reflective cover 160, at least one optical film 170, a reflective film 180 and a frame 190.

The light-guide plate 220 is a wedge light-guide plate having a light transmission surface f3, a reflective surface f2 and four side surfaces f1. One of the side surfaces f1 is a light-incident surface f1'. The light source 140 is arranged on the light-incident surface f1' while the other side surfaces are as reflective surfaces. In an embodiment of the present invention, a reflective film is adhered on the three side surfaces f1 so that the three side surfaces have reflective property.

Especially, the light-guide plate 220 is constituted of a light-guide board 222 and at least one light-guide part 224 buried therein. Preferably, the light-guide part 224 is uniformly buried inside the light-guide board 222. The light-guide board 222 has a first reflective index $n_1$ while the light-guide part 224 has a second reflective index $n_2$ different from the first reflective index $n_1$. In an embodiment of the present invention, the second reflective index $n_2$ is higher than the first reflective index $n_1$. The light-guide part 224 may be a network structure or a sheet structure. The reflective index and the materials of the light-guide board 222 and the light-guide part 224 are similar to the embodiment of FIG. 1 and are omitted. In addition, other components comprising the light source 140, the reflective cover 160, the optical film 170, the reflective film 180 and the frame 190 are also similar to the embodiment of FIG. 1.

Accordingly, the light-guide plate is composed of the light-guide board and the light-guide part having different refractive index. Especially, the light of the light source may be incident on the light-guide board having lower refractive index from the light-guide part having higher refractive index so that the total reflection may easily occur and the light transmission efficiency in the light-guide plate can be improved.

Figure 5:
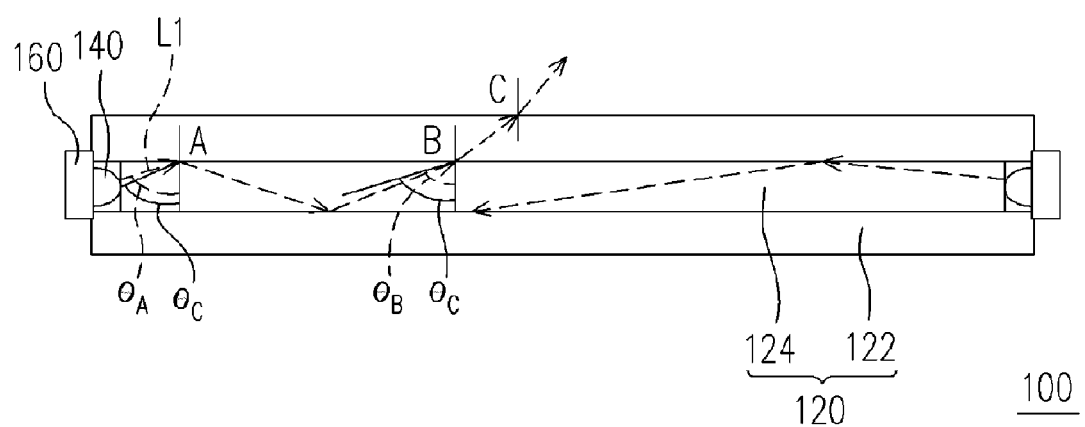
FIG. 5 is a schematic drawing showing light transmission proceeding in the light-guide plate according to an embodiment of the invention.

FIG. 5 is a schematic drawing showing light transmission proceeding in the light-guide plate according to an embodiment of the present invention. As shown in FIG. 5, the light-guide board 122 has a first reflective index $n_1$ while the light-guide part 124 has a second reflective index $n_2$ different from the first reflective index $n_1$. In an embodiment of the present invention, the second reflective index $n_2$ of the light-guide part 124 is higher than the first reflective index $n_1$ of the light-guide board 122. According to the Snell's law, which is expressed by the following equation:

$$n_1 \sin\theta_1 = n_2 \sin\theta_2$$

When the light from one medium is incident on another medium having a lower refractive index ($n_1$) compared to the refractive index ($n_2$) with an incident angle $\theta_2$ higher than a critical angle $\theta_c$, the total reflection may occur.

As shown in FIG. 5, the light L1 emitted from the light source 140 may be incident on the light-guide part 12 having lower refractive index. When the light L1 is incident on the interface A of the light-guide 124 and the light-guide board 122, the incident angle is $\theta_A$. If the incident angle $\theta_A$ is higher than the critical angle $\theta_c$, the total reflection may occur at the interface A. Since the total reflection has very low energy loss, the light transmission efficiency in the light-guide plate 120 can be improved. Thereafter, the angle at which the light L1 is incident on the interface B and the incident angle $\theta_B$ is lower than the critical angle $\theta_c$ so that the light L1 at the interface B may be incident on light-guide board 122 from the light-guide part 124. The refraction of light L1 at the interface C is similar to that at the interface B so that the light L1 is transmitted out of the light-guide plate 122.

Accordingly, the light-guide plate 120 of the backlight module 100 is constituted of the light-guide board 122 and the light-guide part 124 having different refractive index. In an embodiment of the present invention, the light source 140 is aligned to the light-guide part 124 of the light-guide plate 120 so that the light of the light source 140 may first incident into the light-guide part 124 having higher refractive index. When the light from a medium having a lower refractive index is incident on another medium having a higher refractive index at an incident angle larger than a critical angle, the total reflection may occur according to the Snell's law. Because the total reflection has very low energy loss, the light transmission efficiency in the light-guide plate 120 can be improved.

For the foregoing, the light-guide plate and the backlight module of the present invention has the following advantages:

1. The light-guide board and the light-guide part buried therein have different refractive indices so that the total reflection may occur and thereby improve the light transmission efficiency in the light-guide plate. Hence, the backlight module having this light-guide plate can be applied to larger size LCD devices.

2. The scattering points formed on the light-guide part can improve the uniformity of the surface light source produced through the backlight module.

3. All the four side surfaces of the light-guide plate may be light-incident surfaces so that the light source can be arranged on these four side surfaces to increase the brightness of the surface light source.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light-guide plate, comprising:
   a light-guide board, having a first refractive index; and
   at least one light-guide part, buried inside the light-guide board, wherein the light-guide part has a second refractive index larger than the first refractive index, and the light-guide part is a network light-guide part.

2. The light-guide plate according to claim 1, wherein the light-guide part is uniformly buried inside the light-guide board.

3. The light-guide plate according to claim 1, wherein the first refractive index is in a range of 1.4~1.5.

4. The light-guide plate according to claim 1, wherein the second refractive index is in a range of 1.5~1.6.

5. The light-guide plate according to claim 1, wherein the light-guide part is selected from the group consisting of Zeonor, Arton, polycarbonate(PC), epoxy and a combination thereof.

6. The light-guide plate according to claim 1, wherein the light-guide board is selected from the group consisting of epoxy, polymethylmethacrylate (PMMA) and a combination thereof.

7. A backlight module, comprising:
   a light-guide plate, comprising a light-guide board and at least one light-guide part buried inside the light-guide board, wherein the light-guide board has a first refractive index while the light-guide part has a second refractive index larger than the first refractive index, and the light-guide part is a network light-guide part; and
   a light source, arranged on a light-incident surface of the light-guide plate, and the light source is aligned to the light-guide part of the light-guide plate.

8. The backlight module according to claim 7, wherein the light-guide plate has a light-transmission surface, a reflective surface opposite the light-transmission surface and four side surfaces.

9. The backlight module according to claim 8, wherein the light source is arranged on the four side surfaces so that the four side surfaces are as the light-incident surface.

10. The backlight module according to claim 8, wherein the light source is arranged on one of the side surfaces so that this side surface is the light-incident surface and the other three side surfaces are reflective surfaces.

11. The backlight module according to claim 7, wherein the light source is constituted of light emitting diodes or point light sources.

12. The backlight module according to claim 7, wherein the first refractive index is in a range of 1.4~1.5.

13. The backlight module according to claim 7, wherein the second refractive index is in a range of 1.5~1.6.

14. The backlight module according to claim 7, wherein the light-guide part is selected from the group consisting of Zeonor, Arton, polycarbonate (PC), epoxy and a combination thereof.

15. The backlight module according to claim 7, wherein the light-guide board is selected from the group consisting of epoxy, polymethylmethacrylate (PMMA) and a combination thereof.

16. The backlight module according to claim 7, further comprising:
   a reflective film, disposed underneath the light-guide plate;
   at least one optical film, disposed above the light-guide plate; and
   a frame, disposed outside the light-guide plate and the light source for assembling the light-guide plate, the light source, the reflective film and the optical film together.

* * * * *